(12) United States Patent
Marwah et al.

(10) Patent No.: US 10,678,760 B2
(45) Date of Patent: Jun. 9, 2020

(54) TRACKING ROW AND OBJECT DATABASE ACTIVITY INTO BLOCK LEVEL HEATMAPS

(71) Applicant: Oracle International Corporation, Redwood Shores, CA (US)

(72) Inventors: Vineet Marwah, San Ramon, CA (US); Sujatha Muthulingam, Sunnyvale, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 457 days.

(21) Appl. No.: 13/804,884

(22) Filed: Mar. 14, 2013

(65) Prior Publication Data

US 2014/0095438 A1 Apr. 3, 2014

Related U.S. Application Data

(60) Provisional application No. 61/707,685, filed on Sep. 28, 2012.

(51) Int. Cl.
*G06F 16/00* (2019.01)
*G06F 16/185* (2019.01)
(Continued)

(52) U.S. Cl.
CPC .......... *G06F 16/185* (2019.01); *G06F 3/0649* (2013.01); *G06F 16/113* (2019.01);
(Continued)

(58) Field of Classification Search
CPC ........... G06F 17/00; G06F 17/30; G06F 16/00
See application file for complete search history.

(56) References Cited

U.S. PATENT DOCUMENTS 5,680,573 A 10/1997 Rubin
5,933,838 A 8/1999 Lomet
(Continued)

FOREIGN PATENT DOCUMENTS

WO WO 01/82118 A2 11/2001

OTHER PUBLICATIONS

Chi, Ed Huai-hsin, John Riedl, Phillip Barry, and Joseph Konstan. "Principles for information visualization spreadsheets." IEEE Computer Graphics and Applications 4 (1998): 30-38.*

(Continued)

*Primary Examiner* — Farhan M Syed
(74) *Attorney, Agent, or Firm* — Hickman Palermo Becker Bingham LLP

(57) ABSTRACT

A method, apparatus, and system for tracking row and object database activity into block level heatmaps is provided. Database activity including reads, writes, and creates can be tracked by a database management system at the finest possible level of granularity, or the row and object level. To efficiently record the tracked database activity, a two-part structure is described for writing the activity into heatmaps. A hierarchical in-memory component may use a dynamically allocated sparse pool of bitmap blocks. Periodically, the in-memory component is persisted to a stored representation component, sharable with multiple database instances, which may include consolidated last access times and/or a history of heatmap snapshots to reflect access over time. The heatmaps may then be externalized to database users and applications to provide and support a variety of features.

21 Claims, 6 Drawing Sheets

(51) Int. Cl.
*G06F 3/06* (2006.01)
*G06F 16/21* (2019.01)
*G06F 16/22* (2019.01)
*G06F 16/27* (2019.01)
*G06F 16/11* (2019.01)

(52) U.S. Cl.
CPC ............ *G06F 16/21* (2019.01); *G06F 16/217* (2019.01); *G06F 16/22* (2019.01); *G06F 16/27* (2019.01)

(56) References Cited

U.S. PATENT DOCUMENTS

| | | | |
|---|---|---|---|
| 6,223,344 B1* | 4/2001 | Gerard | G06F 9/4493 717/170 |
| 7,251,669 B1 | 7/2007 | Arora et al. | |
| 7,328,192 B1 | 2/2008 | Stengard et al. | |
| 8,316,051 B1 | 11/2012 | Burns | |
| 8,346,747 B2 | 1/2013 | Liu et al. | |
| 8,547,379 B2* | 10/2013 | Pacheco | G09G 5/02 345/440 |
| 8,688,654 B2 | 4/2014 | Groseclose | |
| 8,994,755 B2* | 3/2015 | Robinson | G06F 16/34 345/672 |
| 9,275,063 B1* | 3/2016 | Natanzon | G06F 16/172 |
| 9,798,490 B1* | 10/2017 | Natanzon | G06F 16/172 |
| 2003/0055807 A1 | 3/2003 | Lomet | |
| 2003/0101133 A1 | 5/2003 | DeFrancesco | |
| 2003/0105732 A1 | 6/2003 | Kagalwala et al. | |
| 2003/0236781 A1 | 12/2003 | Lei | |
| 2004/0098383 A1 | 5/2004 | Tabellion et al. | |
| 2004/0117407 A1 | 6/2004 | Kumar et al. | |
| 2005/0027749 A1 | 2/2005 | Ohno | |
| 2005/0149584 A1 | 7/2005 | Bourbonnais et al. | |
| 2005/0256897 A1 | 11/2005 | Sinha | |
| 2006/0085485 A1 | 4/2006 | Shimshoni | |
| 2006/0101052 A1 | 5/2006 | Netrakanti | |
| 2006/0218127 A1 | 9/2006 | Tate et al. | |
| 2007/0088912 A1* | 4/2007 | Mukherjee | G06F 3/0644 711/112 |
| 2007/0156790 A1 | 7/2007 | Sun Hsu et al. | |
| 2007/0198552 A1 | 8/2007 | Farrand | |
| 2007/0208665 A1 | 9/2007 | Ohara | |
| 2008/0040505 A1 | 2/2008 | Britto et al. | |
| 2008/0098045 A1 | 4/2008 | Radhakrishnan et al. | |
| 2008/0235183 A1 | 9/2008 | Draese et al. | |
| 2008/0250073 A1 | 10/2008 | Nori et al. | |
| 2008/0294697 A1 | 11/2008 | Andrasak et al. | |
| 2009/0070382 A1 | 3/2009 | Agrawal et al. | |
| 2009/0177622 A1 | 7/2009 | Hu et al. | |
| 2009/0187544 A1 | 7/2009 | Hsu et al. | |
| 2009/0198729 A1 | 8/2009 | Gong | |
| 2010/0070535 A1* | 3/2010 | Irun-Briz | G06F 16/213 707/802 |
| 2010/0077168 A1 | 3/2010 | Arakawa | |
| 2010/0274827 A1 | 10/2010 | Hix et al. | |
| 2010/0287178 A1* | 11/2010 | Lambert | G06F 16/2228 707/765 |
| 2011/0082842 A1 | 4/2011 | Groseclose et al. | |
| 2011/0106863 A1 | 5/2011 | Mamidi | |
| 2011/0179066 A1* | 7/2011 | Cardno | G06F 16/00 707/769 |
| 2011/0282830 A1* | 11/2011 | Malige | G06F 17/30339 707/609 |
| 2012/0011329 A1 | 1/2012 | Nonaka | |
| 2012/0030247 A1 | 2/2012 | Yambal et al. | |
| 2012/0042130 A1 | 2/2012 | Peapell | |
| 2012/0137059 A1* | 5/2012 | Yang | G06F 3/0611 711/104 |
| 2012/0137061 A1* | 5/2012 | Yang | G06F 3/0611 711/105 |
| 2012/0144098 A1* | 6/2012 | Yang | G06F 3/0611 711/103 |
| 2012/0144099 A1* | 6/2012 | Yang | G06F 3/0611 711/103 |
| 2012/0173477 A1* | 7/2012 | Coutts | G06F 16/217 707/602 |
| 2012/0185648 A1 | 7/2012 | Benhase | |
| 2012/0233129 A1 | 9/2012 | Brinkmoeller | |
| 2012/0260040 A1* | 10/2012 | Mallge | G06F 17/30584 711/117 |
| 2013/0155118 A1* | 6/2013 | Robinson | G06F 16/34 345/672 |
| 2013/0169666 A1* | 7/2013 | Pacheco | G09G 5/02 345/594 |
| 2013/0325326 A1* | 12/2013 | Blumenberg | G01C 21/32 701/428 |
| 2014/0033120 A1* | 1/2014 | Bental | G06Q 30/02 715/803 |
| 2014/0095438 A1* | 4/2014 | Marwah | G06F 16/27 707/639 |
| 2014/0095442 A1 | 4/2014 | Guo et al. | |
| 2014/0095448 A1 | 4/2014 | Marwah et al. | |
| 2014/0095449 A1 | 4/2014 | Marwah et al. | |
| 2014/0095450 A1* | 4/2014 | Marwah | G06F 16/27 707/668 |
| 2014/0122778 A1 | 5/2014 | O'Brien | |
| 2014/0244623 A1* | 8/2014 | King | H04L 67/42 707/722 |
| 2015/0170382 A1* | 6/2015 | Bhatia | G06T 11/20 345/440 |

OTHER PUBLICATIONS

Chi, Ed Huai-Hsin. "A framework for information visualization spreadsheets." PhD diss., University of Minnesota, 1999, pp. 1-160.*
Lambert, Bob, "DMBI Tech Tip: Include Audit Columns on all Tables Cap Tech Consulting", dated Jan. 12, 2011, 2 pages.
Verma et al., "An Architecture for Lifecycle Management in Very Large File Systems", Mass Storage Systems and Technologies, dated 2005, IEEE, 9 pages.
Chen et al., "Information Valuation for Information Lifecycle Management", Autonomic Computing, dated 2005, 12 pages.
U.S. Appl. No. 13/826,075, filed Mar. 14, 2013, Final Office Action, dated Feb. 2, 2015.
U.S. Appl. No. 13/826,075, filed Mar. 14, 2013, Office Action, dated Oct. 1, 2014.
U.S. Appl. No. 13/804,394, filed Mar. 14, 2013, Office Action, dated Oct. 22, 2014.
U.S. Appl. No. 13/826,075, filed Mar. 14, 2013, Advisory Action, dated May 13, 2015.
U.S. Appl. No. 13/750,873, filed Jan. 25, 2013, Restriction Requirement, dated Mar. 20, 2015.
U.S. Appl. No. 13/750,865, filed Jan. 25, 2013, Office Action, dated Mar. 23, 2015.
US App No. 13/804,394, filed Mar. 14, 2013, Office Action, dated Jun. 22, 2015.
U.S. Appl. No. 13/826,075, filed Mar. 14, 2013, Office Action, dated Aug. 13, 2015.
Lambert, Bob, "DMBI Tech Tip: Include Audit Columns on all Tables", CapTech Venrures, dated Jan. 12, 2011, 2 pages.
Ahmed et al., "Lifecycle Management of Relational Records for External Auditing and Regulatory Compliance", IEEE, dated 2011.
U.S. Appl. No. 13/804,581, filed Mar. 14, 2013, Final Office Action, dated Jun. 17, 2015.
U.S. Appl. No. 13/750,873, filed Jan. 25, 2013, Office Action, dated May 26, 2015.
U.S. Appl. No. 13/826,075, filed Mar. 14, 2013, Interview Summary, dated Nov. 18, 2015.
U.S. Appl. No. 13/804,581, filed Mar. 14, 2013, Interview Summarry, dated Nov. 16, 2015.
U.S. Appl. No. 13/804,581, filed Mar. 14, 2013, Office Action, dated Nov. 19, 2015.
U.S. Appl. No. 13/804,394, filed Mar. 14, 2013, Interview Summary, dated Nov. 16, 2015.

(56) References Cited

OTHER PUBLICATIONS

U.S. Appl. No. 13/750,865, filed Jan. 25, 2013, Final Office Action, dated Nov. 4, 2015.
U.S. Appl. No. 13/804,394, filed Mar. 14, 2013, Final Office Action, dated Feb. 10, 2016.
U.S. Appl. No. 13/826,075, filed Mar. 14, 2013, Office Action, dated Feb. 26, 2016.
U.S. Appl. No. 13/826,075, filed Mar. 14, 2013, Final Office Action, dated Jul. 5, 2016.
U.S. Appl. No. 13/804,394, filed Mar. 14, 2013, Advisory Action, dated May 11, 2016.
U.S. Appl. No. 13/750,873, filed Jan. 25, 2013, Final Office Action, dated Jun. 2, 2016.
Marwah, U.S. Appl. No. 13/826,075, filed Mar. 14, 2013, Office Action, dated Dec. 5, 2016.
Ren et al., "A New Buffer Cache Design Exploiting Both Temporal and Content Localities", IEEE, dated 2010, 11 pages.
Marwah, U.S. Appl. No. 13/826,075, filed Mar. 14, 2013, Interview Summary, dated Mar. 6, 2017.
Marwah, U.S. Appl. No. 13/826,075, filed Mar. 14, 2013, Final Office Action, dated May 10, 2017.
Marwah, U.S. Appl. No. 13/804,581, filed Mar. 14, 2013, Office Action, dated May 19, 2017.
Marwah, U.S. Appl. No. 13/804,394, filed Mar. 14, 2013, Office Action, dated May 11, 2017.
Guo, U.S. Appl. No. 13/750,865, filed Jan. 25, 2013, Office Action, dated Jun. 23, 2017.
Marwah, U.S. Appl. No. 13/826,075, filed Mar. 14, 2013, Interview Summary, dated Jul. 17, 2017.
Marwah, U.S. Appl. No. 13/826,075, filed Mar. 14, 2013, Notice of Allowance, dated Oct. 11, 2017.
Marwah U.S. Appl. No. 13/804,581, filed Mar. 14, 2013, Interview Summary, dated Sep. 22, 2017.
Guo, U.S. Appl. No. 13/750,865, filed Jan. 25, 2013, Interview Summary, dated Nov. 22, 2017.
Marwah, U.S. Appl. No. 13/804,581, filed Mar. 14, 2013, Final Office Action, dated Jan. 22, 2018.
Guo, U.S. Appl. No. 13/750,865, filed Jan. 25, 2013, Advisory Action, dated Dec. 6, 2017.
Marwah, U.S. Appl. No. 13/804,394, filed Mar. 14, 2013, Final Office Action, dated Feb. 26, 2018.
Marwah, U.S. Appl. No. 13/804,394, filed Mar. 14, 2013, Office Action, dated Jun. 1, 2018.
Marwah, U.S. Appl. No. 13/804,394, filed Mar. 14, 2013, Advisory Action, dated May 10, 2018.
Guo, U.S. Appl. No. 13/750,865, filed Jan. 25, 2013, Notice of Allowance, dated Aug. 10, 2018.
Marwah, U.S. Appl. No. 13/804,394, filed Mar. 14, 2013, Final Office Action, dated Dec. 5, 2018.
Marwah, U.S. Appl. No. 13/804,581, filed Mar. 14, 2013, Notice of Allowance, dated Jan. 24, 2019.
Guo, U.S. Appl. No. 13/750,873, filed Jan. 25, 2013, Interview Summary, dated Feb. 15, 2019.
Guo, U.S. Appl. No. 13/750,873, filed Jan. 25, 2013, Notice of Allowance, dated May 17, 2019.
Hirschtein et al., "White Paper Unlocking the Potential of Information Lifecycle Managemnt: Usage-based Data Classification for Oracle Databases", dated Aug. 15, 2007, 20 pages.
Anonymous:, "Implementing Information Lifecycle Management Using the ILM Assistant", dated Aug. 16, 2007, 42 pages.

* cited by examiner

DATABASE BLOCK 144A

|  | OrderID | CustomerID | OrderTotal |
|---|---|---|---|
| TABLE ROW 146A → | 1 | 10 | 10.50 |
| TABLE ROW 146B → | 2 | 12 | 25.10 |
| TABLE ROW 146C → | 3 | 10 | 55.00 |

DATABASE BLOCK 144B

|  | OrderID | CustomerID | OrderTotal |
|---|---|---|---|
| TABLE ROW 146D → | 4 | 5 | 9.99 |
| TABLE ROW 146E → | 5 | 9 | 14.99 |
| TABLE ROW 146F → | 6 | 15 | 25.00 |

DATABASE CLIENT REQUEST 180

SELECT * FROM Orders WHERE CustomerID = 10;

DATABASE MANAGEMENT SYSTEM RESPONSE 182

| OrderID | CustomerID | OrderTotal |
|---|---|---|
| 1 | 10 | 10.50 |
| 3 | 10 | 55.00 |

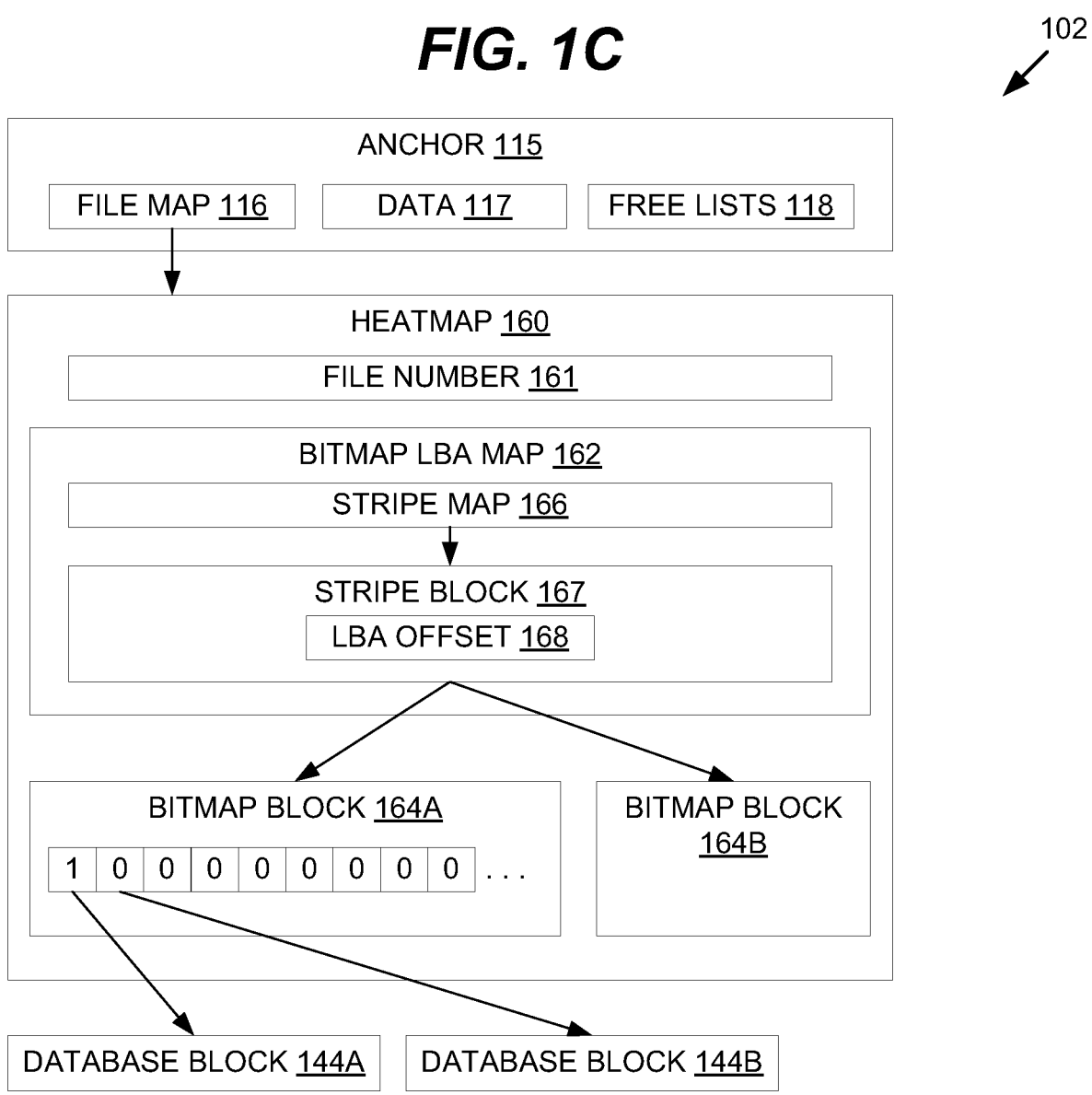

202
Receive a database command for a database

204
Execute the database command, wherein executing the database command accesses one or more database elements, the one or more database elements being stored in one or more affected database blocks

206
In a block-level heatmap, record, for the affected database blocks, activity corresponding to the accesses

TRACKING ROW AND OBJECT DATABASE ACTIVITY INTO BLOCK LEVEL HEATMAPS

CROSS-REFERENCE TO RELATED APPLICATIONS

Benefit Claim

This application claims the benefit of U.S. Provisional Application No. 61/707,685, filed Sep. 28, 2012, which is hereby incorporated by reference in its entirety.

FIELD OF THE INVENTION

The present disclosure relates to databases, and more specifically, to tracking row and object database activity into block level heatmaps.

BACKGROUND

Data is generated and stored at ever increasing rates in organizations both governmental and corporate. While some business data almost never loses its value, the usefulness of most data tends to decline over time until it has no further value for almost any purpose. Generally, the value of business information tends to be the greatest soon after the data is created and remains active for only a short period of time, at most a few years, after which the data's importance to the business, and thus the data's general usage, begins to decline. However, many businesses are constrained by factors, such as legal mandates, requiring data to be retained long after the data's usefulness has expired.

As a result, it has been commonly observed that users access at times as little as 10%-20% of the data stored within a database. The other 80-90% of data is rarely, if ever, accessed by users and yet contributes to the bulk of the storage costs required to maintain the database. To make matters worse, as the volume of data stored by the database increases, performance becomes degraded due to slower full table scans and elongated application upgrades.

Thus, faced with rising storage costs and deteriorating system performance, businesses have sought ways to efficiently manage their database's inactive data. At present, many businesses try to achieve this goal by resorting to third party archiving solutions that offload inactive data out of the database and into archival storage. While these solutions help to ameliorate the effects of accelerated data production, businesses employing third party archiving solutions tend to replace one problem with a host of others.

As one issue, third party archiving solutions tend to lack intimate knowledge of the format and contents of the database. For instance, many third party archiving solutions only work at the level of the file system and therefore can only archive at the granularity of a file. Thus, while a third party archiving solution may be able to offload the individual files that make up the database, the third party archiving solution may not be able to selectively offload individual database elements.

Furthermore, the third party archiving solution may detect inactive data based on file level metrics, such as the frequency or recency with which files are accessed, but may be unable to detect inactivity at the granularity of an individual database element. Consequently, when a database file contains both active and inactive data, third party archiving solutions may be unable to identify and archive only the inactive data. This issue can be exacerbated by database implementations that store data as flat files, where an entire table, or even the entire database, may be contained within a single large file on the file system.

To work around the inability of third party archiving solutions to separate inactive data beyond the granularity of a file, a database administrator may instead manually separate active and inactive data objects into different database files. For example, the database administrator may explicitly move inactive data objects to a separate tablespace, which can then be offloaded to archival storage. However, this workaround introduces heavy database administration burdens, as implementing and validating the required application schema modifications is not a trivial task. For example, the database administrator may be required to discern data access patterns from redo logs and develop customized scripts to separate the inactive data.

Based on the foregoing, there is a need for a method of identifying database activity at a fine granularity level while maintaining database manageability and performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that depicts example database data in a database management system for tracking row and object database activity into block level heatmaps, according to an embodiment;

FIG. 1C is a block diagram that depicts an example structure for an in-memory representation of a heatmap, according to an embodiment;

FIG. 2 is a flow diagram that depicts a process for tracking row and object database activity into block level heatmaps, according to an embodiment;

DETAILED DESCRIPTION

Figure 1A:
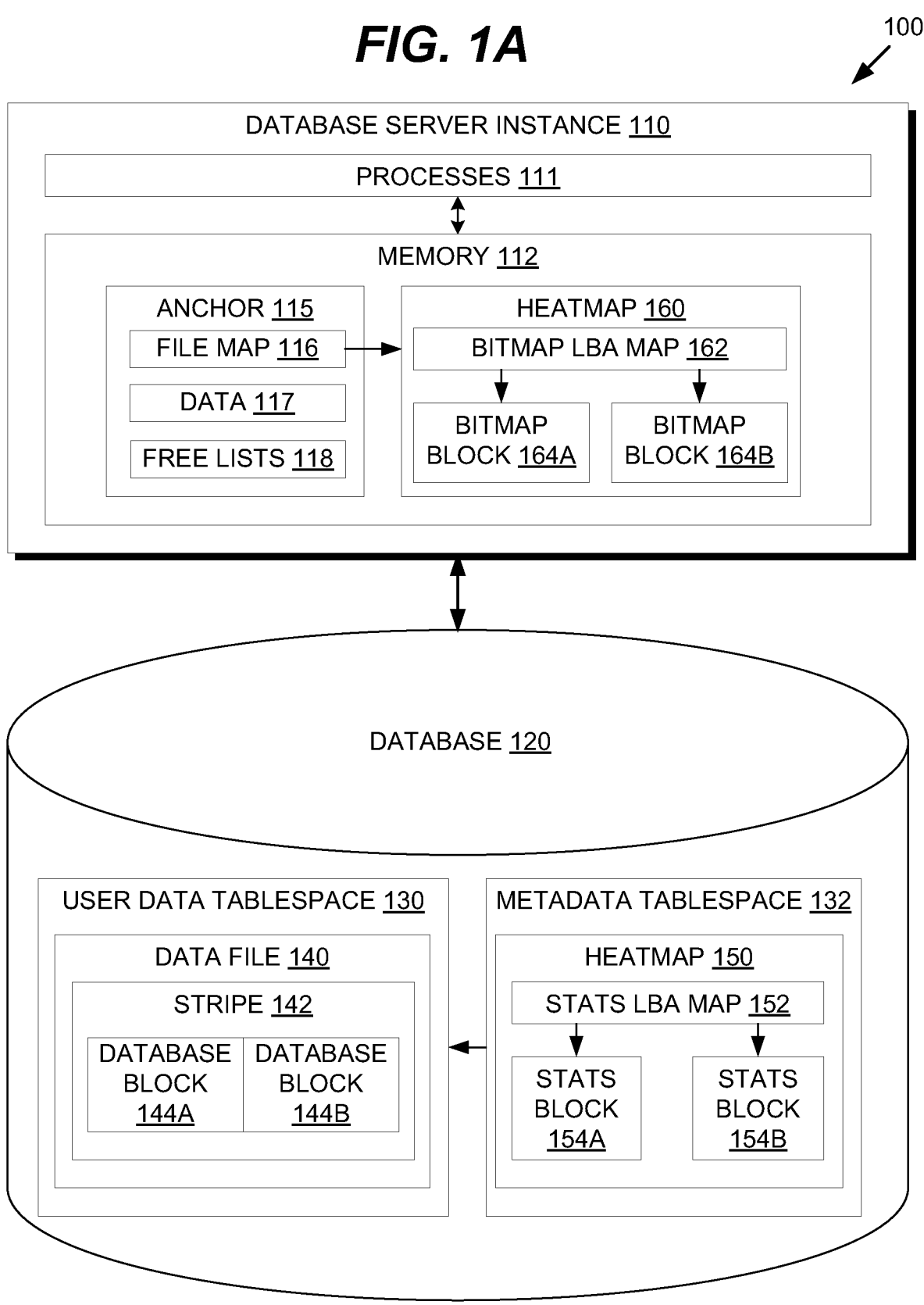
FIG. 1A is a block diagram that depicts an example database management system that tracks row and object database activity into block level heatmaps, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a database management system ("DBMS") tracks database activity at the row and object level. More generally, a database is tracked for activity at the finest database level of granularity, for example rows for row formatted tables, columns for columnar formatted tables, object records for object classes, and database objects. Activity refers to various types of accesses on data elements, including to read or write (modify). The term "heatmap" in this application refers to statistics reflecting activity regarding various elements in a database: elements with recent accesses are "hot" whereas elements without recent accesses are "cold". For optimal performance with minimal resource impact, the heatmap is written using an efficient in-memory representation that is periodically persisted to a stored representation.

While database activity is tracked at the row and object level, the recorded heatmap may map at a next higher level, which may be the database block level, to optimize memory and storage utilization. The statistics in the heatmap can also be aggregated for higher level database structures. An in-memory representation of the heatmap may use sparse data structures such as dynamically allocated bitmap blocks to minimize memory utilization. To maintain high database performance, portions of the in-memory representation may be pre-allocated, and a hierarchical metadata structure may be provided to facilitate rapid database block lookups.

A periodic persisting of the in-memory representation to storage is performed in a manner consistent with the underlying file structure or tablespace format. At the time of persisting, a timestamp or time window may be associated for each recorded activity, which can be consolidated as last access times or logged as snapshots over time. Memory for persisted bitmaps may be freed only after a specific number of persisting cycles with no activity. The stored representation of the heatmap may be structured hierarchically for rapid database block lookups, and may be shared as a single copy between multiple database instances.

Since the activity tracking is performed by the database management system, which can access and understand the internal data structures of the database, database activity can be tracked at the finest possible level of granularity, or the row and object level, which is then written to a block-level heatmap. Activity tracking proceeds transparently in the background as part of the database management system without requiring any manual intervention, placing no administrative burdens on the user. As a result, a highly accurate and detailed heatmap can be produced with minimal user effort, particularly when compared to third party solutions that can only track at the granularity of a file without extensive manual data separation.

By using the in-memory representation and the periodically persisted stored representation of the heatmap as summarized above, activity tracking overhead can be minimized to maintain high performance. Access statistics from the heatmap can be externalized to users and applications at any desired level of granularity from the database block level and up to the partition level, the segment and object level, the tablespace level, and the database level. Advanced features such as database performance profiling and automatic or guided information lifecycle management for archiving inactive data can be supported by leveraging these externalized access statistics.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

FIG. 1A is a block diagram that depicts an example database management system 100 that tracks row and object database activity into block level heatmaps, according to an embodiment. Database management system 100 of FIG. 1A includes database server instance 110 and database 120. Database server instance 110 includes processes 111 and memory 112. Memory 112 includes anchor 115 and heatmap 160. Anchor 115 includes file map 116, data 117, and free lists 118. Heatmap 160 includes bitmap logical block address (LBA) map 162, bitmap block 164A, and bitmap block 164B. Database 120 includes user data tablespace 130 and metadata tablespace 132. User data tablespace 130 includes data file 140. Data file 140 includes stripe 142. Stripe 142 includes database block 144A and database block 144B. Metadata tablespace 132 includes heatmap 150. Heatmap 150 includes stats LBA map 152, stats block 154A, and stats block 154B.

While database management system 100 only shows a single database server instance 110, embodiments may include multiple database server instances supported by one or more nodes. Thus, database management system 100 may be a multi-node database system. Further, while database 120 is shown as stored on a single storage element, database 120 may be supported by any type of underlying storage volume such as tiered storage and disk arrays across multiple local and/or networked physical disks. The storage volumes may be interfaced using an automatic storage manager, a logical volume manager, a clustered file system, or another storage layer.

Database server instance 110 is a server instance supported by a database server of database management system 100. Database server instance 110 includes an allocation of processes 111 and memory 112 for managing access and administration of database 120. Database clients may issue commands and queries directed to database 120, which are then serviced by database server instance 110 and/or other database instances assigned to database 120. Accordingly, database server instance 110 may contain various internal data structures in memory 112 and background processes in processes 111 for managing database 120. For simplicity, database server instance 110 is only shown to include those data structures relevant to activity tracking, such as the in-memory representation of the heatmap, as explained in greater detail below.

Database 120 comprises database data and a database dictionary stored on a persistent memory mechanism, such as the storage volumes as described above. The database dictionary of database 120 may define database objects, which may be allocated in one or more tablespaces such as user data tablespace 130 and metadata tablespace 132. While a single user data tablespace 130 and a single metadata tablespace 132 are shown, database 120 may include multiple data tablespaces and multiple metadata tablespaces. User data tablespace 130 contains user data such as database tables, indexes, and other data, whereas metadata tablespace 132 contains a stored representation of the heatmap, as explained in greater detail below.

User data tablespace 130 is a logical structure that contains one or more data files, such as data file 140, which are physical files on a storage volume. Each data file includes allocation stripes, such as stripe 142. The number of allocation stripes supported in data file 140 may depend on whether user data tablespace 130 is a small file tablespace or a big file tablespace. Each allocation stripe may contain up to a fixed number of database blocks. Each database block represents the smallest unit of storage that database server instance 110 can request from database 120. A size of each database block is independent of a size of each allocation unit in an underlying storage volume. Thus, a single database block may not necessarily map to a single allocation unit.

Data file 140 contains segments, or logical structures that store a database object or a partition thereof. For example, a segment corresponding to a database table "Orders" may be mapped to database blocks 144A and 144B in stripe 142. The mapping of segments to one or more extents of contiguous database blocks may be represented in a reserved metadata area, which is not specifically shown.

Heatmap Generation Process

With a basic outline of database management system 100 now in place, it may be instructive to review a high level overview of the processing steps to generate the heatmaps within database management system 100. Turning to FIG. 2, FIG. 2 is a flow diagram that depicts a process 200 for tracking row and object database activity into block level heatmaps, according to an embodiment.

Receiving a Database Command

At block 202 of process 200, referring to FIG. 1A, database management system 100 receives a database command for database 120. The database command may conform to a database language, including structured query language (SQL). Thus, a database client may enter a SQL command for database 120, which may be entered directly or indirectly from a user or an application that interfaces with database 120. Since database server instance 110 may be an instance of database 120, database server instance 110 may be assigned to receive and process the SQL command.

To provide example data while stepping through process 200, FIG. 1B is a block diagram that depicts example database data in a database management system for tracking row and object database activity into block level heatmaps, according to an embodiment. Diagram 101 of FIG. 1B includes database block 144A, database block 144B, database client request 180, and database management system response 182. With respect to FIG. 1B, like numbered elements may correspond to the same elements from FIG. 1A. Database client request 180 of FIG. 1B includes an example SQL SELECT query, which requests rows from the "Orders" table having a "CustomerID" field equal to 10. The "Orders" table may be stored in user data tablespace 130 of database 120, or more specifically in a segment that includes database blocks 144A and 144B. Example row data for the "Orders" table is shown in FIG. 1B, including table row 146A, table row 146B, and table row 146C in database block 144A and table row 146D, table row 146E, and table row 146F in database block 144B. The final results in response to database client request 180 are shown in database management system response 182.

Developing an Execution Plan

At block 204 of process 200, referring to FIG. 1A, database management system 100 executes the database command from block 202, wherein executing the database command accesses one or more database elements, the one or more database elements being stored in one or more affected database blocks. For example, database server instance 110 may generate an execution plan for the query in database client request 180, which may utilize statistics, heuristics, estimates, and other factors to select an optimal execution plan from various candidate execution plans. The execution plan provides the specific steps or actions to be carried out when executing the database command in the database management system.

For example, to find the matching rows in database client request 180, the execution plan may specify the use of a full table scan on the "Orders" table, or may alternatively specify the use of other access paths such as an index scan if an appropriate index is available. Additionally, operations may be parallelized when possible and advantageous to do so. For the present example, the execution plan may specify a full table scan to be carried out serially on the "Orders" table.

Tracking Row and Object Level Elements

When database server instance 110 executes the execution plan, one or more database elements are accessed. These database elements may be tracked and can include rows for row formatted tables, columns for columnar formatted tables, object records for object classes, and database objects. In other words, the tracked elements correspond to the finest possible database level of granularity, or the row and object level.

To reduce overhead, tracking may be restricted to database objects contained in user data segments, ignoring other types of database objects such as indexes, undo records, and large objects (LOBs). However, in some embodiments, it may be desirable to track accesses to these objects as well. Certain database operations may be exempted from tracking, for example direct path loads, which may instead directly update the stored representation of the heatmap.

For the present example, the tracked elements may be rows of the row formatted "Orders" table. In the course of carrying out the actions or the execution plan in block 204, the elements that are affected within database 120 can be tracked and ascertained. For example, when the full table scan is performed on the "Orders" table in the course of carrying out the execution plan, then table rows 146A and 146C can be tracked as those rows that match the predicate of "CustomerID=10".

In this example, the execution plan only processes the rows in the "Orders" table. However, in an execution plan for a larger or more complex database query, additional predicates and conditions such as table joins may broaden the execution plan to process multiple tables and database objects in database 120. Besides retrieving or reading rows, database commands such as INSERT or UPDATE may also create or modify rows in an execution plan. Regardless of the particular execution plan, all elements in database 120 that are affected by access activity can be tracked during the course of carrying out the execution plan, whether the access activity is a read, write, or create, and whether the element is a row, column, object record, or database object.

During the course of accessing the one or more elements while executing the execution plan, the affected database blocks that contain the one or more elements can also be identified. For example, in the course of retrieving particular database rows within a segment of user data tablespace 130, database management system 100 may identify the specific database blocks containing the particular database rows. In the present example, since table rows 146A and 146C are both contained in a single database block 144A, the affected database blocks only include a single database block 144A. However, multiple database blocks can be affected depending on the number of tracked elements and whether the elements span across multiple database blocks, as in for example a row chain or a relocated row. Having identified the affected database blocks, process 200 may proceed to block 206.

Recording Activity at Block Level

At block 206 of process 200, referring to FIG. 1A, database management system 100 records in a block-level heatmap, for affected database blocks, activity corresponding to the accesses of the one or more database elements. As discussed in the general overview above, the heatmap may be created with an in-memory representation that is periodically persisted to storage. For example, a background process within processes 111 of database server instance 110 may be scheduled to initiate, on a periodic schedule such as an hourly cycle, a persisting of an in-memory representation of the heatmap, such as heatmap 160 in memory 112, to a stored representation of the heatmap, such as heatmap 150 in database 120. A detailed discussion of the heatmap representations and the persisting process is provided in the sections below.

Heatmap In-Memory Representation

FIG. 1C is a block diagram that depicts an example structure for an in-memory representation of a heatmap, according to an embodiment. Diagram 102 of FIG. 1C includes anchor 115, heatmap 160, database block 144A, and database block 144B. Heatmap 160 includes file number 161, bitmap LBA map 162, bitmap block 164A, and bitmap block 164B. Bitmap LBA map 162 includes stripe map 166 and stripe block 167. Stripe block 167 includes LBA offset 168. With respect to FIG. 1C, like numbered elements may correspond to the same elements from FIG. 1A and FIG. 1B.

Hierarchical Metadata Structure

As shown in FIG. 1C, metadata for the in-memory representation of the heatmap is organized using a hierarchical structure. As discussed below, the hierarchy has four levels: a first database level, a second file level, a third stripe level, and a fourth bitmap level. Bitmap blocks corresponding to a specific database block can be quickly located by traversing the hierarchy, which can accommodate very large databases with big data sets. Additionally, the hierarchical structure can provide finer concurrency control, as the heatmap is divided into bitmap blocks that can be independently accessed. While the hierarchical structure shown in FIG. 1C is one example in-memory representation, other data structures may also be used to target other optimization priorities or database configurations.

First Database Level

A first level or database level includes anchor 115, which includes file map 116, data 117, and free lists 118. File map 116 may reference a number of file-specific heatmaps, including heatmap 160 specific to data file 140. File map 116 may have a pre-allocated number of pointers, for example 64K pointers, to reference the file-specific heatmaps. Data 117 may contain high level data including block statistics for persisting cycles, aggregated access statistics, concurrency control structures, global flags and variables, and other data. The block statistics may summarize bitmap block activity for prior persisting cycles, such as the number of bits set in each bitmap block. The aggregated access statistics may aggregate access statistics for higher level structures such as data files, allocation stripes, tablespaces, or the database. For example, the aggregated access statistics may note a number of database blocks accessed for data file 140. Concurrency control structures may include shared latches to mediate write access to bitmap blocks between multiple threads or processes, with child latches provided for mediating bitmap allocation and de-allocation.

Dynamic Allocation

To preserve memory space, the file-specific heatmaps and other portions of the in-memory representation may be allocated dynamically on demand. Thus, when access activity occurs on a specific data file in database 120, then the file-specific heatmap for that specific data file may be dynamically created if not already present, updating file map 116 and free lists 118 as necessary. Since database 120 only contains a single data file 140, only a single heatmap 160 is shown. However, multiple file-specific heatmaps may be present when activity is tracked in multiple data files. A similar process may also occur for memory allocation at the stripe level and the bitmap level. To keep track of free space at the file, stripe, and bitmap levels, free lists within free lists 118 or any other memory management technique may be utilized.

Pre-Allocation

To reduce the processing overhead of dynamic allocation, portions of the in-memory representation may be pre-allocated at the time of starting database server instance 110. Thus, anchor 115 may be created and allocated in advance, along with an initial allocation of file-specific heatmaps, stripe blocks, and bitmap blocks. The initial allocation may be based on a particular threshold, such as a sufficient amount to accommodate 10% of the maximum possible database blocks in database 120. While 10% is given as one example, the initial allocation can be set to any value depending on estimated database workload and available memory resources.

Second File Level

A second level or file level includes the file-specific heatmaps, also referred to as file anchors for a file context. In a given file-specific heatmap, such as heatmap 160, file number 161 may identify the associated file, which may be an absolute file number that uniquely identifies the data file within database 120. For heatmap 160, file number 161 may identify data file 140 in database 120. Each file-specific heatmap includes a stripe map, such as stripe map 166, which maps to one or more stripe blocks, such as stripe block 167. The number of stripe blocks depends on the number of allocation stripes within the data file. In the case of heatmap 160, only a single stripe block 167 is present since data file 140 only contains a single stripe 142. In other data files, for example a data file for a big file tablespace, the number of allocation stripes may be limited to a set number, such as 1024 allocation stripes.

Third Stripe Level

A third level or stripe level includes the stripe blocks, such as stripe block 167, also referred to as a stripe anchor for a stripe context. Each stripe block may map to a certain number of bitmap blocks, which may depend on the number of bitmap blocks addressable within a single allocation stripe and the number of database blocks addressable within a single bitmap block. For example, a stripe block may divide an allocation stripe addressing 4M (mega) database blocks into 32 bitmap blocks, where each bitmap block addresses a range of 128K database blocks.

Stripe block 167 includes LBA offset 168, or the beginning of the stripe 142 in data file 140. Bitmap blocks referenced by stripe block 167 map to contiguously allocated database blocks of data file 140 beginning at LBA offset 168. Accordingly, given a particular LBA in a specific data file, such as data file 140, the appropriate bitmap block containing the bit for the LBA can be found by following the hierarchy from top to bottom. Starting at the first database level, a specific file number 161 is followed in file map 116 to reach the second file level. Given a specific LBA, bitmap LBA map 162 can be followed to find the correct bitmap block: from the second file level to the third stripe level using stripe map 166, and from the third stripe level to the fourth bitmap level using stripe block 167.

Fourth Bitmap Level

A fourth level or bitmap level includes the bitmap blocks, also referred to simply as bitmaps. As shown in bitmap block 164A, each bit in a bitmap block maps to a specific database block within data file 140, which can be uniquely referenced by using a LBA. Each bitmap block may have a fixed maximum size, such as 16K bytes or 128K bits, to address a certain LBA range of database blocks, such as 128K database blocks. For example, bitmap block 164A may map to the first 128K database blocks starting from LBA offset 168, and bitmap block 164B may map to the next 128K database blocks starting from LBA offset 168 plus 128K. The structure of bitmap block 164B may be similar to that of bitmap block 164A. While stripe block 167 only maps to two bitmap blocks in FIG. 1C, stripe block 167 may map any number of bitmap blocks mapping into database blocks that fit in an allocation stripe, for example 32 bitmap blocks as discussed above.

Continuing with the example illustrated in process 200, database block 144A is the only affected database block for the read access of table rows 146A and 146C. Accordingly, the bit that maps to database block 144A is lit or set to 1 in the appropriate bitmap block, or bitmap block 164A. Thus, as shown in bitmap block 164A, the first bit is set to 1 to indicate recent access activity for database block 144A. The second bit remains as 0, indicating that database block 144B has not been recently accessed. The time period for "recent" may depend on the time period between each periodic persisting to storage, as discussed below. The remaining bits similarly indicate recent access activity or inactivity for additional database blocks, which are not specifically shown in FIG. 1C.

In bitmap block 164A, each bit indicates any type of access for a corresponding database block, such as a read access, a write or modify access, or a create access. In some embodiments, each bit may indicate only one type of access, rather than any type of access. In this case, if each type of access is to be tracked separately in a bitmap block, then multiple bitmaps for each type of access may be stored, or several bits may be reserved for each type of access.

Since the bitmap level is allocated dynamically as a sparse pool of bitmaps, memory requirements can be kept reasonable. Accesses for a database block in the bitmap level are recorded using only a single bit, accelerating metadata operations while minimizing memory footprint. Bitmap block growth is restrained by freeing bitmap blocks after a certain period of inactivity. Further, in response to a low memory condition, bitmap blocks can also be forcibly persisted to storage and freed.

Heatmap Stored Representation

Returning back to FIG. 1A, metadata tablespace 132 is a tablespace that may be automatically generated by database management system 100 for the purpose of storing system metadata. When user data tablespace 130 is a small file tablespace, metadata tablespace 132 may contain heatmap 150, a stored representation of the heatmap, which is generated by periodically persisting in-memory heatmap representations such as heatmap 160. Heatmap 150 may be specifically stored in a special statistics segment, as discussed below.

Persisting to Small File Tablespace

Figure 1D:
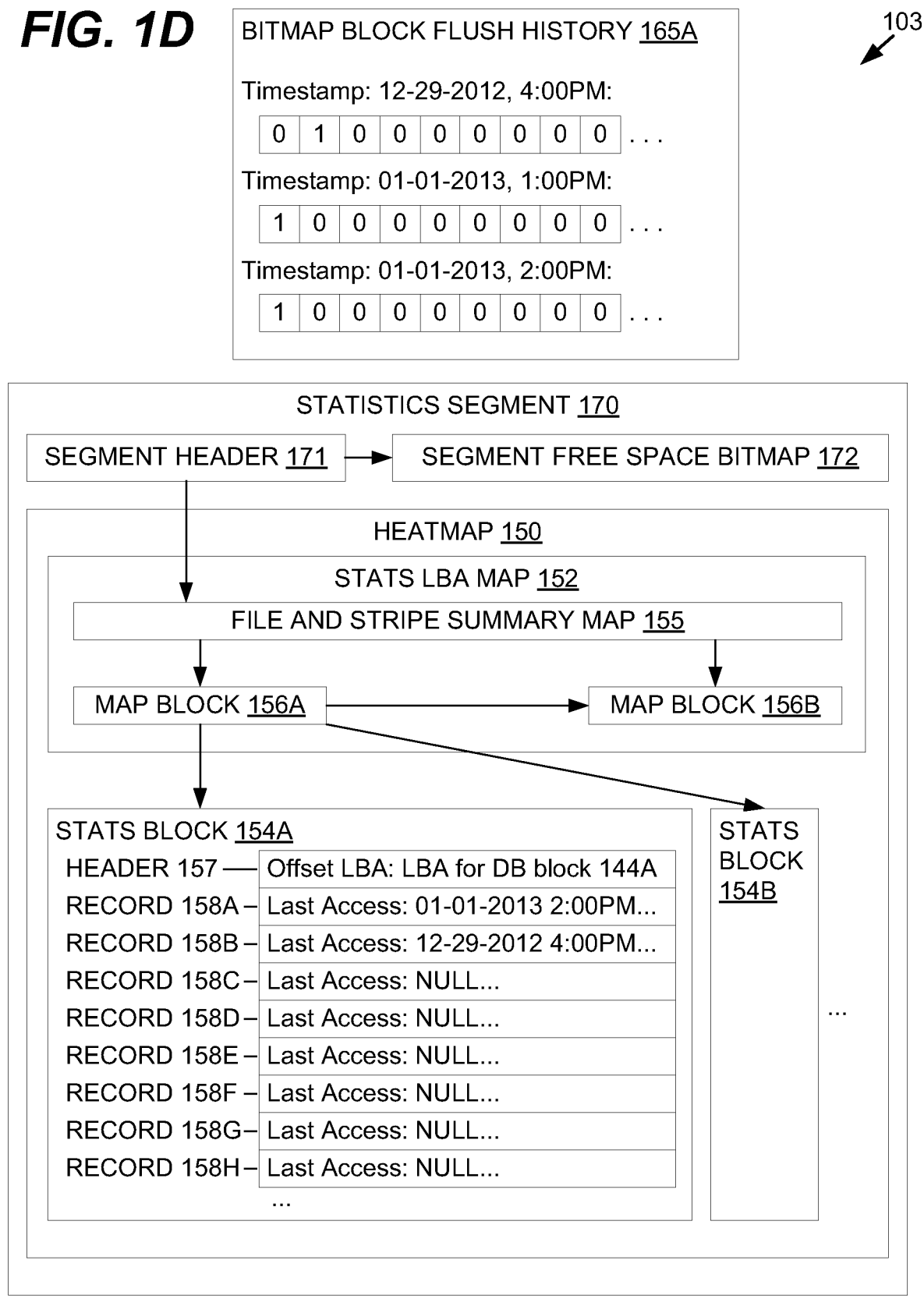
FIG. 1D is a block diagram that depicts an example persisting of a bitmap block into a stored representation, according to an embodiment.

Proceeding to FIG. 1D, FIG. 1D is a block diagram that depicts an example persisting of a bitmap block into a stored representation, according to an embodiment. Diagram 103 of FIG. 1D includes bitmap block flush history 165A and statistics segment 170. Statistics segment 170 includes segment header 171, segment free space bitmap 172, and heatmap 150. Heatmap 150 includes stats LBA map 152, stats block 154A, and stats block 154B. Stats LBA map 152 includes file and stripe summary map 155, map block 156A, and map block 156B. Stats block 154A includes header 157, record 158A, record 158B, record 158C, record 158D, record 158E, record 158F, record 158G, and record 158H. With respect to FIG. 1D, like numbered elements may correspond to the same elements from FIG. 1A.

Statistics Segment Structure

Statistics segment 170 may be a special type of metadata segment optimized for storing access statistics. Besides including an extent map, segment aggregates, and other data typically stored in a segment header, segment header 171 may also include aggregated access statistics from data 117 and pointers to metadata structures specific to statistics segments, such as segment free space bitmap 172 and file and stripe summary map 155. Segment free space bitmap 172 may indicate free extents within statistics segment 170. Each extent may be set to a fixed size, such as 1 MB (megabyte) worth of allocation blocks. For example, with an allocation block size of 16 KB, an extent may correspond to 64 allocation blocks. Portions of statistics segment 170 may be pre-allocated on creation, including segment header 171, segment free space bitmap 172, file and stripe summary map 155, and an initial allocation of map blocks and stats blocks.

Similar to the in-memory representation, the metadata for the stored representation of heatmap 150 is also organized in a hierarchy. Stats LBA map 152 may be used to find a stats block that includes access statistics for a given database block LBA. At a first file and stripe level, file and stripe summary map 155 maps to one or more map blocks, such as map block 156A, which are each specific to a given allocation stripe in a given data file.

At a second block range level, map block 156A may further divide the allocation stripe into a number of ranges, for example 72 ranges, each associated with a single stats block, such as stats block 154A. The map blocks may be organized into a singly linked list, as shown by the link from map block 156A to map block 156B, allowing new map blocks to be added dynamically on demand. While a map block for a given database block LBA can be found by following the linked list, a constant time lookup that uses an index such as file and stripe summary map 155 is preferable for performance reasons. Segment header 171 and segment free space bitmap 172 may be utilized for dynamic memory management.

At a third stats block level, each stats block such as stats block 154A-154B may include a number of records, such as records 158A-158H, containing access statistics for corresponding database blocks. Records 158A-158H may be a fixed size, for example 20 bytes, to store access timestamps and other data. Each stats block may fill a single extent in statistics segment 170. Thus, the specific number of records in a single stats block may depend on the size of the extent and the size of each stats record. Note that a stats block within an extent may not necessarily reference the same number of database blocks as an in-memory bitmap block. As with the map records, the stats blocks may be dynamically allocated, and an initial allocation may be provided, such as 8 extents of stat blocks.

Bitmap Block Flush

Referring to bitmap block flush history 165A, an example history of three prior flush events for a single bitmap block is provided. Thus, a flush of bitmap block 164A occurred at a first timestamp 12-29-2012 at 4:00 PM, at a second timestamp 01-01-2013 at 1:00 PM, and at a third timestamp 01-01-2013 at 2:00 PM. The contents of bitmap block 164A at the third timestamp may correspond to the state of bitmap block 164A in FIG. 1C.

With a periodic heatmap persisting cycle of 1 hour, each timestamp indicates the end of a 1 hour access time window for the associated bitmap. Thus, bitmap block flush history 165A indicates that database block 144B was accessed on 12-29-2012 between 3:00 to 4:00 PM, and that database block 144A was accessed on 01-01-2013 between 12:00 PM to 1:00 PM and again from 1:00 PM to 2:00 PM. Timestamps associated with an empty bitmap, or a bitmap filled with zeroes, are not present in bitmap block flush history 165A, as an empty bitmap simply indicates a lack of access activity during the time window indicated by the timestamp.

As discussed above, the hierarchical metadata in stats LBA map 152 may be consulted to find the stats block for a given database block LBA. Since bitmap block flush history 165A concerns bitmap block 164A in particular, which maps to database block 144A, stats LBA map 152 may be utilized to find stats block 154A as mapping to database block 144A, as reflected in header 157. Accordingly, record 158A maps to database block 144A, record 158B maps to database block 144B, and so on.

After flushing bitmap block 164B at the first timestamp, a last access timestamp of record 158B is updated with a timestamp of 12-29-2012, 4:00 PM, as shown. After flushing bitmap block 164A at the second timestamp, a last access timestamp of record 158A is updated with a timestamp of 01-01-2013, 1:00 PM. After flushing bitmap block 164A at the third timestamp, a last access timestamp of record 158A is updated with a timestamp of 01-01-2013, 2:00 PM, as shown. The remaining records 158C-158H indicate null last access timestamps, which may indicate no access after initial creation or an uninitialized database block. While each record 158A-158H only includes a single last access timestamp statistic, other last access timestamps can be included in each record, such as a last read timestamp, a last modified timestamp, and a creation timestamp. Each timestamp may be a 32 bit, 64 bit, or any other sized timestamp value. Further, instead of just a timestamp, an explicit time window may be written.

Heatmap Flush

By following the above bitmap block flushing process for every bitmap block in the in-memory representation of the heatmap, the heatmap can be persisted to a stored representation. To accelerate the heatmap flushing process, the database may be taken temporarily offline, deferring database requests until the heatmap flushing process completes. The database may also be kept online during the heatmap flushing process if it is undesirable to defer database requests. The length of the periodic persisting cycle can be adjusted from the discussed 1 hour cycle to reach a desired tradeoff between time window granularity and database overhead. Since the stats blocks and much of the metadata can be dynamically allocated, storage footprint can be minimized.

The above process consolidates the access statistics such that only the last access timestamps are stored for the affected database blocks. However, in some embodiments, it may be desirable to record access statistics over time, rather than just the last access time. In this case, the in-memory representations may be written as multiple periodic snapshots which are appended to a statistics history log. This log may be especially useful for database performance profiling. A logical OR of bitmap blocks mapping to the same database block range can be used to consolidate the log into a heatmap for a specific time window, such as a specific day or week.

Persisting to Big File Tablespace

In the case where user data tablespace 130 is a big file tablespace rather than a small file tablespace, heatmap 150 may be integrated as part of user data tablespace 130 rather than being stored separately in metadata tablespace 132. The structures shown in statistics segment 170 can be written as metadata blocks of user data tablespace 130. Additionally, to improve I/O performance, all of the stats blocks and metadata necessary for a stripe can be pre-allocated in a single contiguous reserved header area of each allocation stripe. As an exception, the first allocation stripe may allocate metadata dynamically in a manner similar to statistics segment 170, thereby reducing up-front storage requirements for smaller databases using big file tablespaces.

Metadata Embedded in Database Blocks

In another embodiment, each database block in a user data segment may contain a reserved metadata header area to embed the associated access statistics directly within the same database block, avoiding the need for separate metadata structures altogether. While this approach to persisting heatmaps is conceptually simple, it may also require changes to existing database formats, making this approach difficult to implement for existing database management systems. Furthermore, since the statistics metadata is dispersed across every database block, statistics metadata operations may place heavy I/O loads on the database, reducing database performance.

Freeing Bitmap Blocks

After the persisting step, which may proceed on a periodic schedule such as an hourly schedule as described above, the bitmap blocks in the in-memory representation of the heatmap, including heatmap 160, are reset to an empty or zeroed state and may be freed from memory 112. If memory 112 enters a low memory condition, then a persisting task may be queued ahead of the periodic schedule to flush bitmap blocks from memory 112, where empty heatmaps may be immediately freed and populated heatmaps may be persisted to storage.

A bitmap block may be freed from memory 112 only after a certain number of persisting cycles occur without any activity on the bitmap block. For example, statistics concerning persisting cycles in data 117 can be consulted and updated for each persisting cycle. When allocated bitmap blocks remain empty after a certain number of cycles, for example 2 cycles, then the empty bitmap blocks may be returned to free lists 118. However, as discussed above, a bitmap block may be freed in response to a low memory condition, which may occur prior to reaching the certain number of cycles in an empty state.

Externalizing Access Statistics

To retrieve access statistics for a specific database block, the heatmap bit corresponding to the database block may first be searched in-memory to determine activity for the present persisting cycle. If the heatmap bit is not referenced in heatmap 160 or another in-memory heatmap, then on-disk heatmap 150 may be consulted to determine activity for past persisting cycles, using stats LBA map 152 to locate the specific stats block containing the statistics for the specific database block. The above process for an individual database block may be repeated to gather statistics for higher level database elements containing multiple database blocks, such as data files, allocation stripes, tablespaces, and other database structures. Alternatively, aggregated access statistics in data 117 may be used, which can also be persisted into segment header 171 of statistics segment 170.

To retrieve access statistics for an element in the row and object level, a heatmap bit for the database block containing the element may be used. For example, if the heatmap bit is on or lit, then at least one row in the database block is known to have activity, which may be treated as an estimate of all rows in the database block having activity. On the other hand, if the heatmap bit is off or zero, then all of the rows in the database block are known to have no activity.

After the statistics are gathered for the appropriate element, the statistics may be externalized to users and applications via defined database views, PL/SQL packages, or other interfaces. With access statistics being tracked at the lowest row and object level, recorded into heatmaps at the fine grained database block level, and externalized to users and applications at any desired level, advanced features can be supported such as database performance profiling and automatic or guided information lifecycle management for archiving inactive data.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
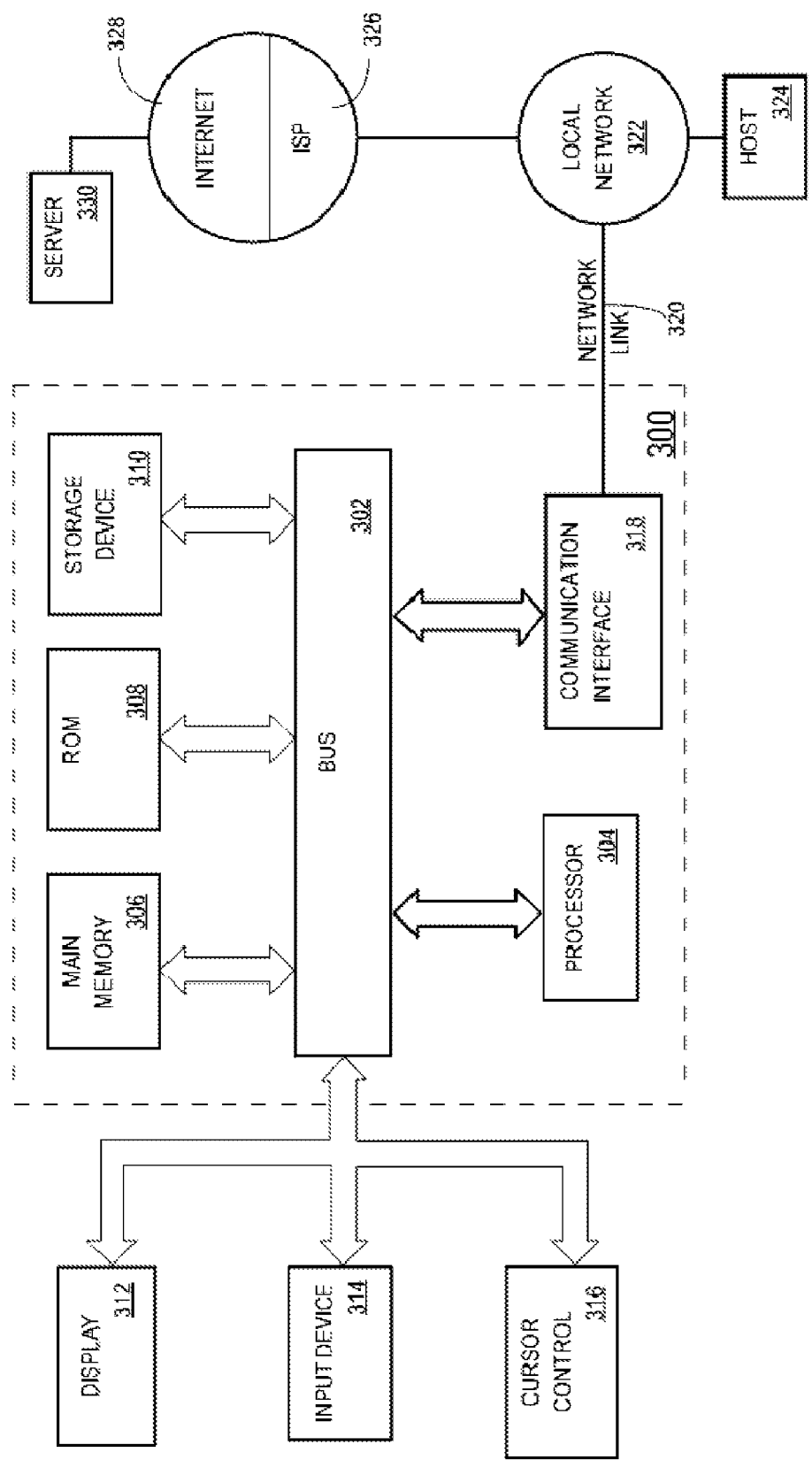
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   executing a first database command by:
      accessing one or more database elements stored in a first database block of a plurality of contiguously allocated database blocks each comprising a unit of persistent storage, and
      updating a block-level heatmap by indicating, in a first single bit in a bitmap block of the block-level heatmap, that the first database block was accessed;
   persisting a first version of the bitmap block in association with a first timestamp;
   creating a second version of the bitmap block that has said first single bit reset;
   while executing a second database command that accesses a second database block of the plurality of contiguously allocated database blocks, indicating in a second single bit in the second version of the bitmap block that the second database block was accessed;
   persisting the second version of the bitmap block in association with a second timestamp that is later than said first timestamp;
   based on the first version of the bitmap block, second version of the bitmap block, first timestamp, and the second timestamp, generating database access statistics for at least one database element.

2. The method of claim 1, wherein updating the block-level heatmap includes periodically persisting an in-memory representation of the block-level heatmap to a stored representation of the block-level heatmap and resetting the in-memory representation of the block-level heatmap.

3. The method of claim 2, wherein the in-memory representation of the block-level heatmap includes a pool of dynamically allocated bitmaps.

4. The method of claim 1,
   wherein the block-level heatmap comprises a bitmap that maps to the plurality of contiguously allocated database blocks.

5. The method of claim 3, wherein the stored representation of the block-level heatmap is a single copy shared between multiple database instances of a database.

6. The method of claim 2, wherein said persisting comprises consolidating the in-memory representation into one or more last access timestamps for each of the plurality of contiguously allocated database blocks.

7. The method of claim 2, wherein said persisting comprises writing the in-memory representation as periodic snapshots appended to a log.

8. The method of claim 1, wherein the first database block was accessed includes read activity for the plurality of contiguously allocated database blocks.

9. The method of claim 1, wherein the first database block was accessed includes write activity for the plurality of contiguously allocated database blocks.

10. The method of claim 1, wherein the first database block was accessed includes creation activity of the plurality of contiguously allocated database blocks.

11. The method of claim 1, wherein the one or more database elements are one or more rows of a row formatted table affected by the first database command.

12. The method of claim 1, wherein the one or more database elements are one or more columns of a columnar formatted table affected by the first database command.

13. The method of claim 1, wherein the one or more database elements are one or more database objects affected by the first database command.

14. A non-transitory computer-readable medium storing one or more sequences of instructions which, when executed by one or more processors, cause:
   executing a first database command by:
      accessing one or more database elements stored in a first database block of a plurality of contiguously allocated database blocks each comprising a unit of persistent storage, and
      updating a block-level heatmap by indicating, in a first single bit in a bitmap block of the block-level heatmap, that the first database block was accessed;
   persisting a first version of the bitmap block in association with a first timestamp;
   creating a second version of the bitmap block that has said first single bit reset;
   while executing a second database command that accesses a second database block of the plurality of contiguously allocated database blocks, indicating in a second single bit in the second version of the bitmap block that the second database block was accessed;

persisting the second version of the bitmap block in association with a second timestamp that is later than said first timestamp;

based on the first version of the bitmap block, second version of the bitmap block, first timestamp, and the second timestamp, generating database access statistics for at least one database element.

15. The non-transitory computer-readable medium of claim 14, wherein updating the block-level heatmap includes periodically persisting an in-memory representation of the block-level heatmap to a stored representation of the block-level heatmap and resetting the in-memory representation of the block-level heatmap.

16. The non-transitory computer-readable medium of claim 15, wherein said persisting comprises consolidating the in-memory representation into one or more last access timestamps for each of the plurality of contiguously allocated database blocks.

17. A database management system comprising one or more computing devices configured to:

execute a first database command by:
  accessing one or more database elements stored in a first database block of a plurality of contiguously allocated database blocks each comprising a unit of persistent storage, and
  updating a block-level heatmap by indicating, in a first single bit in a bitmap block of the block-level heatmap, that the first database block was accessed;

persisting a first version of the bitmap block in association with a first timestamp;

creating a second version of the bitmap block that has said first single bit reset;

while executing a second database command that accesses a second database block of the plurality of contiguously allocated database blocks, indicating in a second single bit in the second version of the bitmap block that the second database block was accessed;

persisting the second version of the bitmap block in association with a second timestamp that is later than said first timestamp;

based on the first version of the bitmap block, second version of the bitmap block, first timestamp, and the second timestamp, generating database access statistics for at least one database element.

18. The database management system of claim 17, wherein the one or more computing devices is configured to update the block-level heatmap by periodically per persisting an in-memory representation of the block-level heatmap to a stored representation of the block-level heatmap and resetting the in-memory representation of the block-level heatmap.

19. The database management system of claim 18, wherein the in-memory representation of the block-level heatmap includes a pool of dynamically allocated bitmaps.

20. The database management system of claim 18, wherein said persisting comprises consolidating the in-memory representation into one or more last access timestamps for each of the plurality of contiguously allocated database blocks.

21. The method of claim 1, wherein a stored representation of the block-level heatmap is a single copy shared between multiple database instances of a database.

* * * * *